United States Patent

Nymann

[11] Patent Number: 6,092,327
[45] Date of Patent: Jul. 25, 2000

[54] DEVICE FOR USE IN CONNECTION WITH FISHING

[75] Inventor: Egil Nymann, Oslo, Norway

[73] Assignee: A/S Plast & Verktoy, Norway

[21] Appl. No.: 09/214,241

[22] PCT Filed: Jul. 2, 1997

[86] PCT No.: PCT/NO97/00167

§ 371 Date: Dec. 31, 1998

§ 102(e) Date: Dec. 31, 1998

[87] PCT Pub. No.: WO98/01028

PCT Pub. Date: Jan. 15, 1998

[30] Foreign Application Priority Data

Jul. 5, 1996 [NO] Norway ................................. 962836

[51] Int. Cl.[7] .............................................. A01K 97/02
[52] U.S. Cl. ..................................... 43/44.99; 43/42.06
[58] Field of Search ........................... 43/44.99, 42.06; 239/34

[56] References Cited

U.S. PATENT DOCUMENTS 2,791,058   5/1957   Bettini .
2,922,246   1/1960   Mileschuk .
4,138,794   2/1979   Chiodini ............................. 43/43.14
4,267,658   5/1981   Brown et al. .
4,799,328   1/1989   Goldman ............................. 43/42.06
4,888,907  12/1989   Gibbs .

*Primary Examiner*—Jack W. Lavinder
*Attorney, Agent, or Firm*—Quarles & Brady LLP

[57] ABSTRACT

A device for use in connection with fishing, comprising a container (1) adapted for dispensing of odor agents underwater, said container containing a piston device having portions (6, 7) with two different diameters, whereby one end of the portion (7) having the largest diameter is situated in a drive chamber (B) having at least one aperture (4) for inlet of water axially outside of said portion (7), while one end of the portion (6) having the smallest diameter is situated in a chamber (A) containing the odor agent, whereby the portion (7) having the largest diameter is able to force the portion (6) having the smallest diameter along the inner of the container (1), in order to force the odor agent out through at least one aperture (5) in the chamber (A) containing the odor agent, axially outside of the portion (6) having the smallest diameter, whereby means is provided for controlled dispensing of the odor agent.

9 Claims, 2 Drawing Sheets

DEVICE FOR USE IN CONNECTION WITH FISHING

FIELD OF THE INVENTION

The present invention relates to a device for use in connection with fishing, comprising a container adapted for dispensing of odor agents under water.

BACKGROUND OF THE INVENTION

Many kinds of fish are completely dependent on the sense of smell in order to find food. This in particular applies to demersal fish species which often live in environments (great depths, darkness) where odor agents dispensed from prey animals are the only signals which enable the fish to discover and localize its food. Advantage is derived from this circumstance when fishing with tackles based on bait, as for instance longline and fish pot.

Chemical analyses have shown that the concentration of odor agents dispensed from natural bait diminishes very rapidly. Measurements have been made which show that the sinking time of tackles based on bait is relatively long. A longline uses for instance about one hour in sinking down to a depth of 450 meters. This means that the bait has dispensed the essential of its odor agents before it reaches the relevant depth for catching fish, and this circumstance cannot be affected.

Different devices for dispensing odor agents under water in connection with fishing are known. U.S. Pat. No. 2,791,058 shows an elongate container having several apertures, whereby a water soluble bladder containing an odor agent is situated inside the container, so that the odor agent will trickle out while the bladder is dissolved. U.S. Pat. No. 2,922,246 also shows a container containing a bladder with odor agent. The container has an aperture at one end and a nozzle at the other end, and by being pulled in the direction of the end having the aperture the bladder will be subjected to a certain external pressure which squeezes the odor agent through the nozzle. The U.S. Pat. Nos. 4,267,658 and 4,888,907 show hollow fishing implements which are equipped with hooks and which contain agents that are attractive to fish, whereby the agents are dispensed through apertures in the implements. U.S. Pat. No. 4,267,658 shows the use of the force in a line in order to cause a certain internal pressure head in a bellows containing the agents.

SUMMARY OF THE INVENTION

The present invention is based upon the recognition that the efficiency of fishing implements based on bait and implements traditionally not based on bait can be significantly increased if the dispensing of odor agents can be controlled in a favourable manner, both with respect to the point of time when the dispensing of odor starts and the duration of the dispensing, and that it may be favourable to vary the dispensing by adapting it to activity peaks which the fish may have during 24 hours. A use of the device with respect to fishing not based on bait may be in net fishing.

The device according to the invention is characterized by the features appearing from the accompanying claims.

During use under water the device according to the invention will dose a controlled quantity of liquid concentrate of odor agent, for instance finely divided octopus or mackerel, in doses or with a controlled, possibly a constant dispensing of the odor agent.

The device according to the invention can be fastened to the catching trickle or lowered separately, and it may be equipped with electronic timing and/or quantity control means and a mechanical automatically working dosing mechanism which dispenses odor agents luring the fish to the catching trickle. By not actuating the device until a large pressure head is present due to the depth, dispensing of odor agents on depths that are riot of interest for catching fish is prevented The use of the odor agents, thus, can be performed selectively and rationally.

BRIEF DESCRIPTION OF THE DRAWINGS

An example of a device in accordance with the invention will in the following be explained more detailed, with reference to the accompanying drawings.

DETAILED DESCRIPTION OF THE INVENTION

Figure 2:
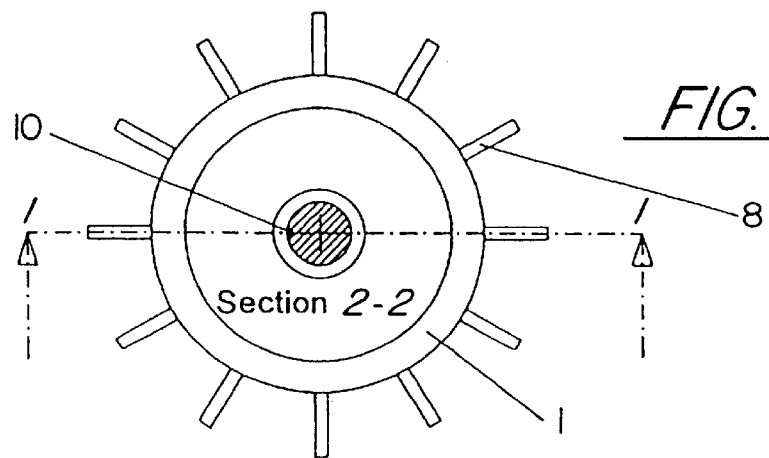
FIG. 2 is a cross section along the line A—A in FIG. 1.

The device in accordance with the invention comprises a cylindrical container 1 divided into two chambers, A and B, having approximately the same volume. The diameter of the chamber B is larger than that of the chamber A. The bottom and top of the container 1 (as shown extending vertically) are closed by screw caps 2, 3 which constitute end portions of the chambers A and B. The cap 3 has a small through-going aperture 4 in the axially outermost end. The cap 2 has a larger (with respect to diameter) throughgoing aperture 5 in the axially outermost end. A dosing piston 6 having a piston rod 9 is situated in the chamber A and protrudes through the aperture 5 in the cap 2. In order to resist large water pressures the container may externally be reinforced by ribs 8 (FIG. 2). The chamber A is pressure balanced in that water flows into the chamber. In the chamber B is provided a piston 7 having a seal 14 and a piston rod 12 in abutment against the dosing piston 6.

In place of two pistons 6 and 7 a unitary (integrated) piston may be used, where the pistons 6 and 7 constitute piston portions.

Figure 1:
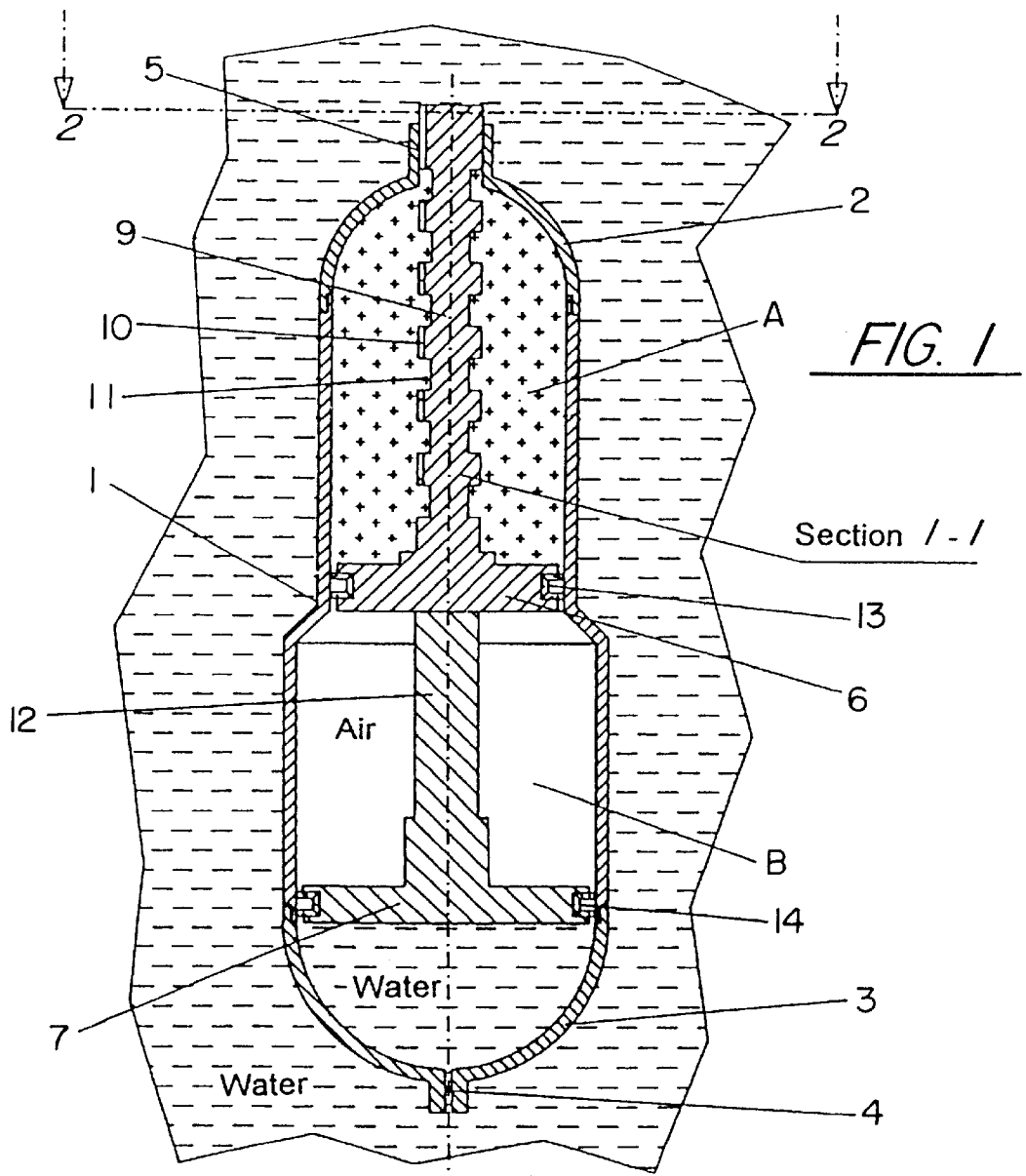
FIG. 1 shows a longitudinal section through the device, in a condition before it is influenced by an external pressure which actuates the device.

The piston rod 9 of the dosing piston 6 is shaped with a longitudinal groove 10 and circumferential recesses or "pockets" 11 for transportation of the odor concentrate. By moving the piston 7 and the dosing piston 6 to the bottom of the respective chambers A and B (at the bottom of FIGS. 1 and 3), whereby a cavity is formed on the upper side of the pistons, the cavity above the piston 6 in the chamber A can be filled with odor concentrate.

Figure 3:
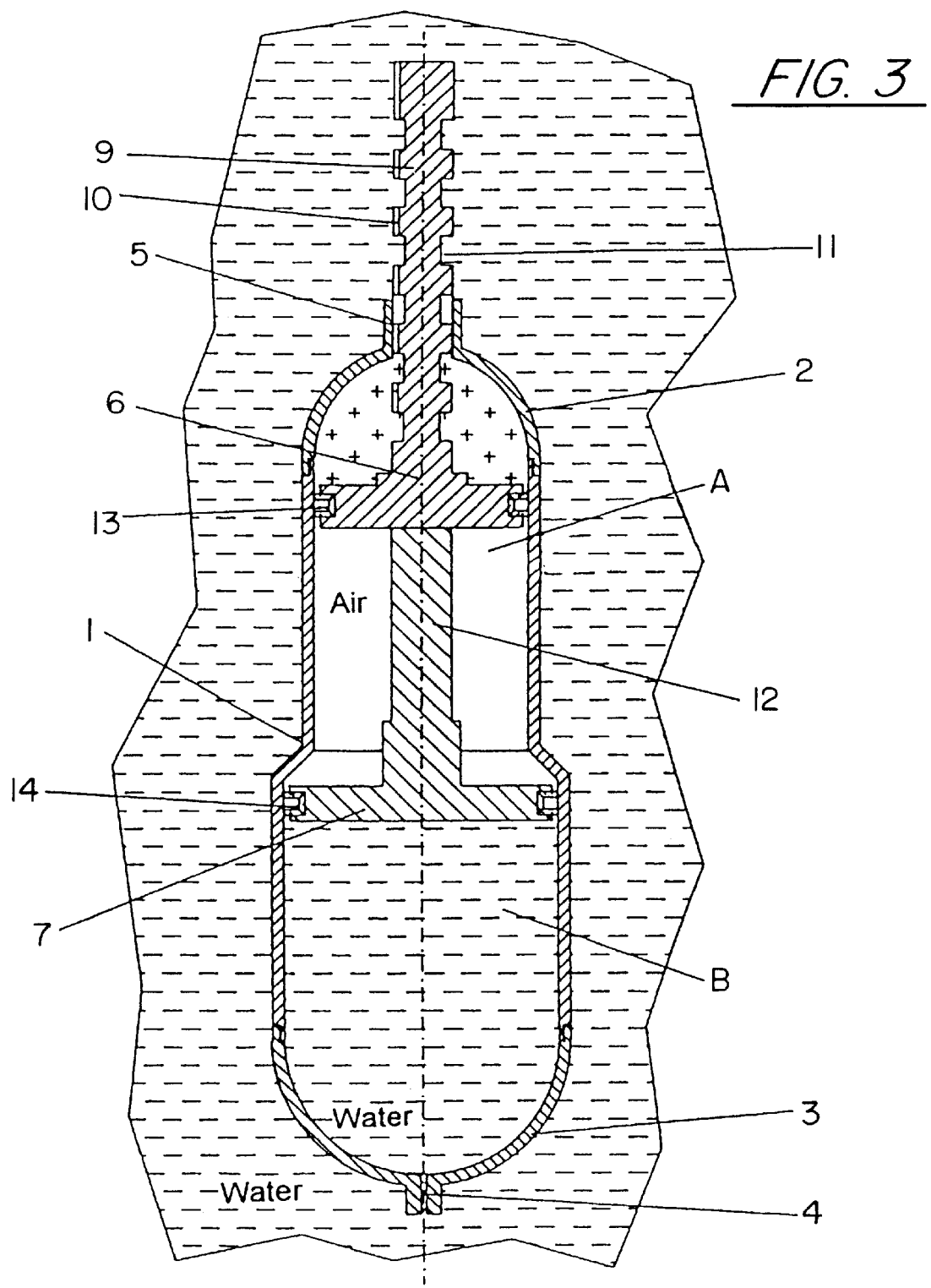
FIG. 3 shows the device in an actuated condition, during dispensing of odor agents.

The device may for instance be lowered together with the catching implements, alternatively separately by having weigths mounted thereon, to the desired depth. Along the path down to the desired depth the statical water pressure increases, and water flows into the chamber B through the aperture 4 and presses the piston 7 in the direction of the chamber A. The water pressure creates a counterforce against the upper side of the dosing piston 6, but because the end surface of the piston 7 is larger than the end surface of the dosing piston 6, the force against the piston 7 will be larger than against the dosing piston 6, and both of the pistons 6 and 7 will be forced in the direction of the aperture 5, until the piston 7 reaches the transition between the chambers A and B (FIG. 3), where the container 1 has a step. The water seeps into the chamber A, forced by the statical water pressure, along the groove 10 in the dosing piston 6, whereby the pressure inside the chamber A becomes the same as on the exterior. The small aperture 4 in the cap 3 may be made with different diameters in order to adjust the rate of seeping in the water. With small aperture diameters the seeping in of water into the chamber B is choked, whereby the velocity of the pistons is reduced to the desired velocity. During the movement of the pistons the rod 9 is moved progressively longer out of the aperture 5 and dispenses in the free water on the exterior a certain amount of odor agent through the groove 10 in the rod 9. When a recess or "pocket" in the rod 9 reaches and passes the aperture 5 a relatively large amount of odor agent is dispensed in the free water, until a new zone of the rod 9 without any recess or "pocket" passes the aperture, whereby odor agent can only pass through the groove 10. The process of movement continues until the dosing piston 6 and the piston 7 reach the end positions (at the top of the FIGS. 1 and 3) and the chamber A is approximately emptied of its contents of odor agent (FIG. 3).

The rod 9 through the aperture 5 may be replaced by a valve, for instance an automatic check valve or an electronically controlled valve. Also the aperture 4 may be equipped with a valve, for instance a valve which opens at a predetermined external pressure (i.e. a predetermined water depth) or an electronically controlled valve. The controlling of the operation of the device may also take place by means of an electronically controlled unit for timing and regulation of the amount. This unit may be operative at one of the apertures 4 or 5, or at both. Thereby may be achieved that the device follows a predetermined program for dispensing of odor agent. Controlling of the apertures 4 and 5 is sufficient, because the pistons 6 and 7 are driven by the statical water pressure, in response to opening and closing of the apertures 4 and 5, or choking of the aperture 4, respectively.

The device according to the invention may be made in several sizes, adapted to leisure fishing as well as to professional fishing, and it may of course be adapted to or dimensioned for any water pressures or water depths. In particular for professional fishing several devices can be used simultaneously.

The components incorporated in the device can be made of several different materials, but materials which are resistant against water are of course preferred. For use in salt water the components should of course also withstand both water and salt. Different plastics types, possibly fiber reinforced, and composite materials, are well suited for the container and the piston device, but different metals may also be used.

The container may of course be equipped with attachment members, in order to be attached to for instance a line or a wire, or in order to be attached to fishing implements for being lowered therewith. Moreover, the container may be shaped for mounting of electronic equipment.

What is claimed is:

1. A container for use in connection with fishing adapted for dispensing of an odor agent underwater, comprising:

a drive chamber with at least one first aperture for inlet of water;

a chamber for containing the odor agent, having at least one second aperture for expelling of the odor agent;

a piston device having a first portion and a second portion, said first portion having a diameter larger than said second portion, one end of said first portion being disposed in the drive chamber, one end of the second portion being disposed in the chamber containing the odor agent, whereby the first portion forces the second portion along the interior of the container to force the odor agent through the at least one second aperture, said first and second portions separating said chamber containing the odor agent from said drive chamber; and, means for controllably dispensing of the odor agent.

2. A container according to claim 1, wherein the means for controllably dispensing is a rod integral with the second portion, said rod protruding out through the second aperture and having a varying cross-sectional shape, said rod having recesses for carrying along odor agent through the second aperture.

3. A container according to claim 1, wherein the first aperture includes means for pressure-dependent opening.

4. A container according to claim 2, wherein at least one of the first and second apertures includes means for electronically controlling the progress of dispensing odor agent.

5. A container according to claim 1, wherein the first aperture includes means for pressure-dependent opening.

6. A container according to claim 5, wherein at least one of the first and second apertures includes means for electronically controlling the progress of dispensing odor agent.

7. A container according to claim 1, wherein at least one of the first and second apertures includes means for electronically controlling the progress of dispensing odor agent.

8. A container according to claim 1, wherein at least one of the first and second apertures includes means for electronically controlling the progress of dispensing odor agent.

9. An underwater device for dispensing of an odor agent into water surrounding said underwater device, comprising:

a container defining:
   an odor chamber,
   a water chamber separate from said odor chamber,
   a first aperture fluidly connecting said water chamber with the water, and
   a second aperture from said odor chamber to the water; and, a piston movably disposed within said container, said piston including a portion and a rod, said portion separating said odor chamber from said water chamber, said rod extending into said second aperture and preventing fluid connection of said odor chamber with the water, said rod defining at least one pocket for receiving the odor agent, said at least one pocket recessed within said rod, whereby pressure exerted by the water in said water chamber against said portion displaces said rod through said second aperture.

* * * * *